Jan. 2, 1923.

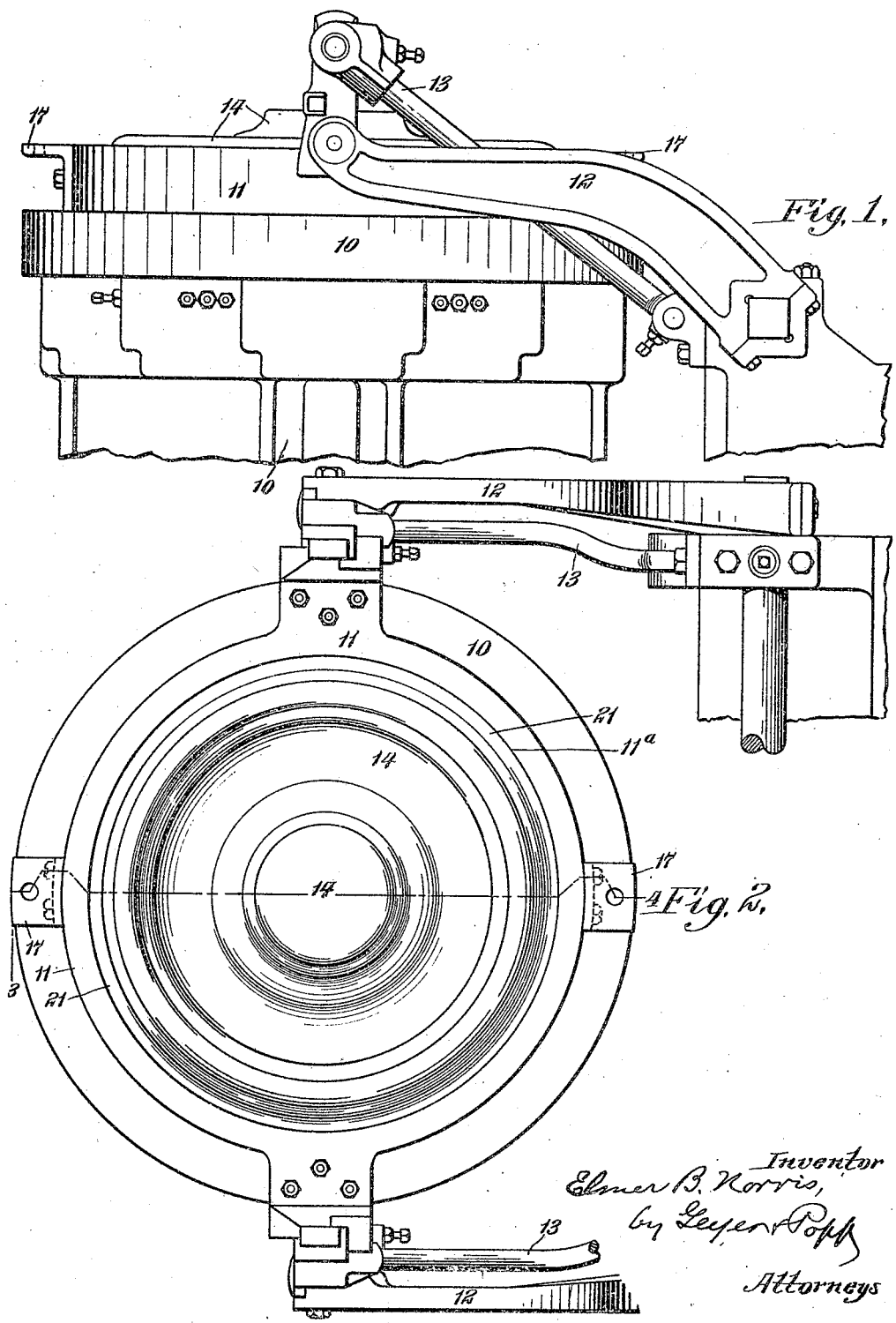

E. B. NORRIS.
TURNOVER PLATE AND PATTERN FOR MOLDING MACHINES.
FILED DEC. 11, 1920.

1,441,166.

2 SHEETS—SHEET 2.

Inventor
Elmer B. Norris,
by Geyer Popp
Attorneys.

Patented Jan. 2, 1923.

1,441,166

UNITED STATES PATENT OFFICE.

ELMER B. NORRIS, OF BUFFALO, NEW YORK.

TURNOVER PLATE AND PATTERN FOR MOLDING MACHINES.

Application filed December 11, 1920. Serial No. 429,848.

*To all whom it may concern:*

Be it known that I, ELMER B. NORRIS, a citizen of the United States, residing at Buffalo, in the county of Erie and State of New York, have invented new and useful Improvements in Turnover Plates and Patterns for Molding Machines, of which the following is a specification.

This invention relates to the turn-over plates and patterns used in connection with molding machines, particularly those including a pneumatic jarring table upon which the turn-over plate normally rests, and a stripper mechanism over which the plate with the attached drag is inverted, preparatory to lowering and withdrawing the drag from the pattern.

Heretofore, the construction of the parts has been such as to require separate turn-over plates for different-sized patterns, rendering the equipment correspondingly expensive and requiring considerable space to store the numerous plates as well as a large amount of labor to handle and change them from time to time.

It is one of the objects of my invention to lessen the cost of the molding equipment, and the required labor and storage space, by reducing the number of parts to a minimum. A further object is to avoid the formation of fins at the outer edges of the castings and thus do away with the necessity and expense of grinding the castings.

Figure 3:
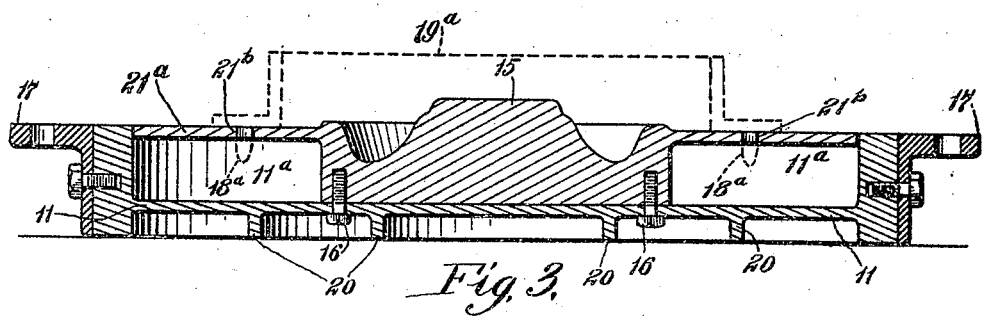
Figure 4:
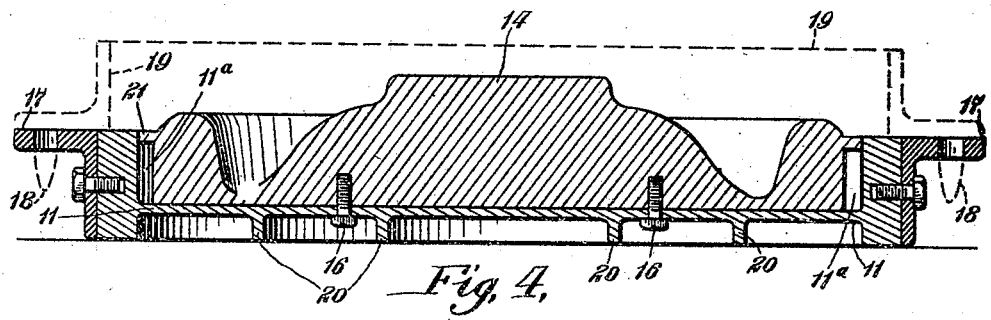

In the accompanying drawings:

Figure 1 is a fragmentary side elevation of a molding apparatus embodying the invention. Figure 2 is a top plan view of the turn-over plate, its carrying arms and the pattern. Figures 3 and 4 are enlarged transverse sections on line 3—4, Fig. 2, showing different-sized patterns secured to the turnover plate.

Similar characters of reference indicate corresponding parts throughout the several views.

10 indicates the jarring table of a molding machine upon which the turn-over plate 11 normally rests in the usual manner; 12 indicates the vertically-swinging arms which carry said plate, and 13 the customary rods which cause the plate to turn over when elevated by the arms 12. The plate is chambered or recessed, as usual, as shown at $11^a$, and is adapted to receive one of a plurality of different-sized patterns 14 and 15, the pattern being removably secured therein by bolts 16 or other suitable means. The plate has the usual perforated ears 17 for receiving the pins 18 of a flask-drag 19 shown by dotted lines in Fig. 4, and its back may be stiffened by the customary ribs 20.

Each pattern plate is provided with a marginal flange whose edge is in close proximity to the wall of the recess $11^a$, there being preferably a clearance of about one sixty-fourth of an inch between the parts. In the case of a relatively large pattern, such as 14, Fig. 4, which nearly fills said recess, the pattern is provided with a narrow flange 21 just wide enough to bridge the space between the body of the pattern and the wall of the recess, while in the case of a comparatively small pattern, as 15, Fig. 3, the pattern is provided with a comparatively wide flange $21^a$ of sufficient diameter to bridge the wider space. In other words, whether the patterns are large or small, their over-all dimensions, including their flanges, correspond to the diameter of said recess, so as to properly fit the same and prevent molding sand from entering between said wall and the body of the pattern in filling and ramming the drag.

A single or universal turn-over plate is thus applicable to a greater or less number of patterns, doing away with the necessity of providing as many separate plates as there are different sized patterns. The result is a very material saving in the cost of the molding equipment, in storage space for the plates and in the labor incident to removing the turn-over plate from its carrying arms and replacing it with a different-sized one, as hitherto required.

In the drawings, only two patterns of different sizes are shown, by way of example, but in practice a larger number of sizes may be used with the same turn-over plate.

For a large pattern, such as shown in Fig. 4, a relatively large drag 19 is used, while for a smaller pattern, such as shown in Fig. 3, a correspondingly smaller drag $19^a$ is employed. In the latter case, the pattern-flange $21^a$ is provided with holes $21^b$ for receiving the drag-pins $18^a$.

By providing each pattern with a marginal flange such as 21 or $21^a$, which projects beyond the outer edge of the pattern body, the further important advantage is obtained that the joint is located at the outer edge of said flange instead of between the said wall and the body of the pattern as heretofore. The pattern can therefore be withdrawn without breaking or injuring the outer edge of the mold, avoiding the formation of a fin at that point and saving the time and expense of grinding the casting.

The improvement is especially desirable for molding car wheels, but is equally useful for molding various other articles of circular or other forms.

I claim as my invention:

The combination of a turn-over plate having a pattern-recess, and a pattern having a marginal flange and adapted to fit into said recess, the overall diameter of the pattern, inclusive of said flange, corresponding to the diameter of said recess, whereby said flange bridges the space between the body of the pattern and the surrounding wall of the turn-over plate and excludes molding sand from said space.

ELMER B. NORRIS.